United States Patent
Thoemmes et al.

(10) Patent No.: US 11,550,641 B2
(45) Date of Patent: Jan. 10, 2023

(54) EXTENDING THE KUBERNETES API IN-PROCESS

(71) Applicant: Red Hat, Inc., Raleigh, NC (US)

(72) Inventors: Markus Thoemmes, Grasbrunn (DE); Francesco Guardiani, Milan (IT)

(73) Assignee: Red Hat, Inc., Raleigh, NC (US)

(*) Notice: Subject to any disclaimer, the term of this patent is extended or adjusted under 35 U.S.C. 154(b) by 367 days.

(21) Appl. No.: 16/938,508

(22) Filed: Jul. 24, 2020

(65) Prior Publication Data
US 2022/0027217 A1 Jan. 27, 2022

(51) Int. Cl.
*G06F 9/54* (2006.01)
*G06F 9/50* (2006.01)

(52) U.S. Cl.
CPC ............ *G06F 9/542* (2013.01); *G06F 9/5011* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 2020/0133689 A1* | 4/2020 | Ferrell | .................. | H04L 41/044 |
| 2021/0200814 A1* | 7/2021 | Tai | .................... | G06F 16/90335 |
| 2021/0397729 A1* | 12/2021 | McQuaid | ................ | G06F 16/13 |

FOREIGN PATENT DOCUMENTS

CN 110888736 A 3/2020

OTHER PUBLICATIONS

Github, "Operator SDK User Guide," https://github.com/operator-framework/operator-sdk/blob/master/doc/user-guide.md, 2020, 22 pages.
Flugel.it, "Building Custom Kubernetes Operators Part 3: Building Operators in Go using Operator SDK," Apr. 16, 2019, 12 pages.
O'Reilly, "Programming Kubernetes by Michael Hausenbias, Stefan Schimanski," 2020, 29 pages.
Go, "Package Reconcile," https://pkg.go.dev/sigs.k8s.io/controller-runtime/pkg/reconcile?tab=doc, Mar. 18, 2020, 4 pages.

* cited by examiner

*Primary Examiner* — Craig C Dorais
(74) *Attorney, Agent, or Firm* — Womble Bond Dickinson (US) LLP

(57) ABSTRACT

Systems and methods for extending a container orchestration engine API in-process are disclosed. A processing device may compile each of one or more custom resource definition (CRD) controllers that are created in a cluster at run-time into a respective isolation module to generate one or more isolation modules, wherein the one or more isolation modules are all hosted in a service. The processing device may monitor for application program interface (API) events serviced by each of the one or more CRD controllers and in response to detecting an API event serviced by a CRD controller of the one or more CRD controllers, executing a respective isolation module of the CRD controller.

20 Claims, 8 Drawing Sheets

EXTENDING THE KUBERNETES API IN-PROCESS

TECHNICAL FIELD

Aspects of the present disclosure relate to container orchestration engines, and more particularly, to the deployment and operation of controllers.

BACKGROUND

A container orchestration engine (such as the Redhat™ OpenShift™ module) may be a platform for developing and running containerized applications and may allow applications and the data centers that support them to expand from just a few machines and applications to thousands of machines that serve millions of clients. Container orchestration engines may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
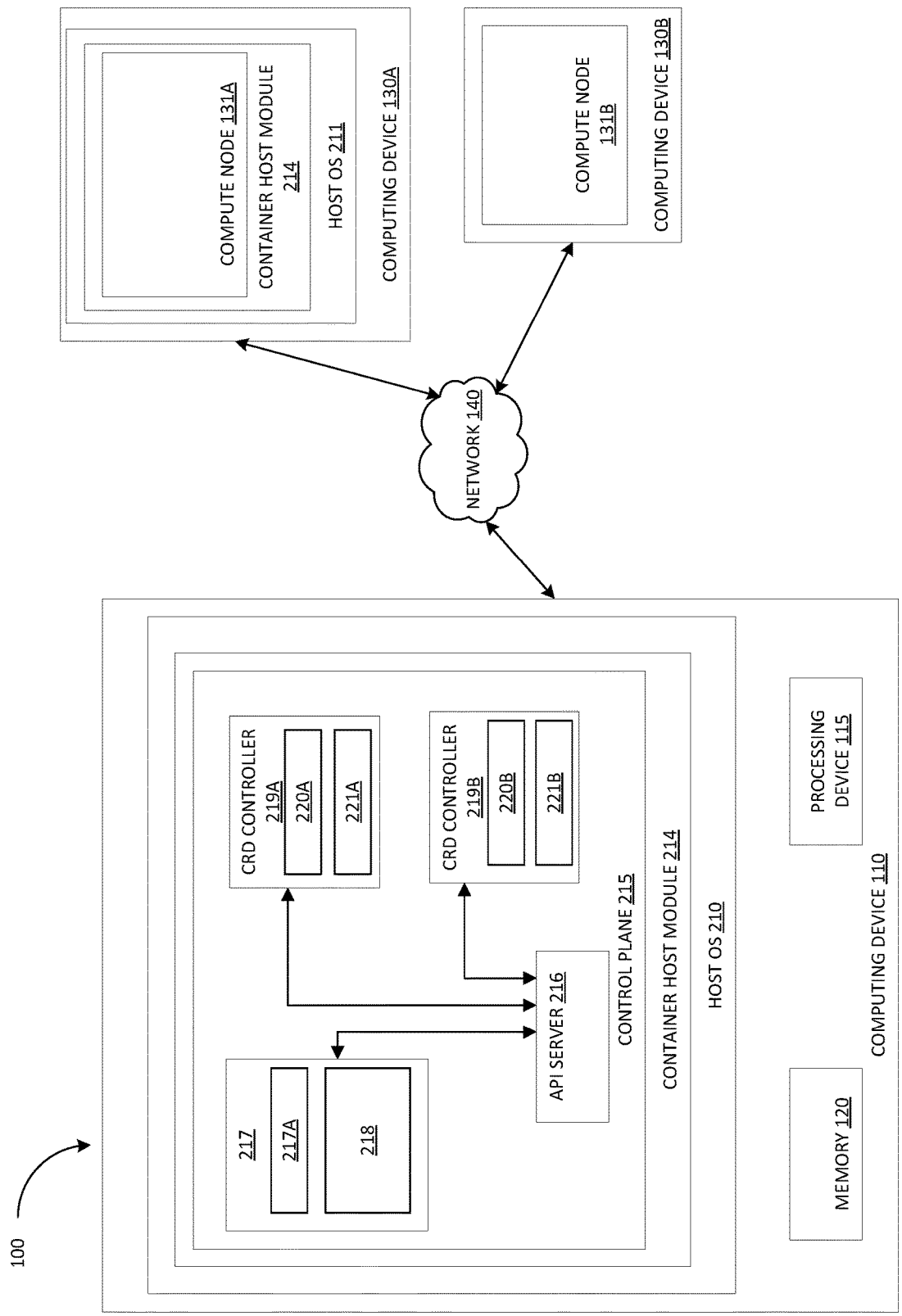
FIG. 1 is a block diagram that illustrates an example system, in accordance with some embodiments of the present disclosure.

Container orchestration engines such as Kubernetes can be extended using custom resource definitions (CRDs). CRDs declare and define a new custom resource (CR) which may be picked up by a controller to perform some meaningful action (servicing the CR), such as provision an external system. These CRDs can be used as an extension point for a system and in many cases, it is desirable to have a number of precisely scoped CRDs to properly abstract away operational concerns of a Kubernetes cluster.

Every CRD needs its own controller, which is a process that requires a pod which is running on the cluster. Because the extensions are not necessarily applied at cluster instantiation, each controller lives in a separate service (application) from the main reconciler of the Kubernetes core APIs (e.g., the kube-controller-manager). These services run in their own newly created deployments and as a result, a new pod is required at least for every group of CRDs (if multiple controllers are built into a single service) and in a worst-case scenario, a separate pod is required for each CRD. Each pod allocates a number of CPUs, memory, and other resources. The cost in resources is amplified when every pod is made highly available. This problem is exacerbated because many of these pods will be idling for large stretches of time with no work to be done.

Resources can be saved by packing a larger number of controllers into the same service. For example, Knative controllers can be statically complied into a single service. However, this compilation occurs at build time, not at run-time, and thus does not allow for dynamic extension.

The present disclosure addresses the above-noted and other deficiencies by using a processing device to compile each of one or more custom resource definition (CRD) controllers that are created in a cluster at run-time into a respective isolation module to generate one or more isolation modules. The one or more isolation modules may all be hosted in the same service (e.g., the controller manager service), which may include an isolation module runtime to facilitate execution of CRD controllers via their respective isolation modules. The isolation module runtime may also provide an interface for managing the lifecycle of the CRD controllers and facilitating communication between the service and the isolation modules. Upon receiving an isolation module in which a CRD controller has been compiled, the interface may update an informer of the service with controller metadata of the CRD controller to enable the interface to monitor for application program interface (API) events serviced by the CRD controller. In response to detecting an API event serviced by a CRD controller of the one or more CRD controllers, the informer may indicate to the interface that an event has been detected and the CRD controller that it pertains to. The interface may execute the respective isolation module of the CRD controller such that the CRD controller may service the detected event. In this way, the CRD controllers do not run in background (e.g., as background processes) while their respective isolation module is not executing, and may transition from their inactive state to an active state upon execution of their respective isolation module.

FIG. 1 is a block diagram that illustrates an example system 100. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 of computing device 110 and 130 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a compute node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. In some embodiments, each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 214 may work with are called pods. A pod may refer to one or more containers deployed together on a single host, and the smallest compute unit that can be defined, deployed, and managed. Each pod is allocated its own internal IP address, and therefore may own its entire port space. A user (e.g., via the container host module 214) may define the entry point script of a pod to instruct the pod to configure itself as a unique simulated compute node with its own IP addresses and simulated network stacks and communicate with the internal API of the control plane. Containers within pods may share their local storage and networking. In some embodiments, pods have a lifecycle in which they are defined, they are assigned to run on a node, and they run until their container(s) exit or they are removed based on their policy and exit code. Although a pod may contain one or more than one container, the pod is the single unit that a user may deploy, scale, and manage. The control plane 215 of the container host 214 may include controllers 215A-D, one or more of which may be e.g., a replication controller that indicates how many pod replicas are required to run at a time and may be used to automatically scale an application to adapt to its current demand.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The worker nodes 131 may run the aspects of the container host 214 that are needed to launch and manage containers, pods, and other objects. For example, a worker node may be a physical server that provides the processing capabilities required for running containers in the environment. A worker node may also be implemented as a virtual server, logical container, or GPU, for example.

The control plane 215 may include REST APIs (not shown) (e.g., Kubernetes APIs) which expose objects, as well as controllers 218 and 219 which read those APIs, apply changes to objects, and report status and/or write back to objects. Objects may be persistent entities in the container host 214, which are used to represent the state of the cluster 131 (e.g., deployments, replicasets, and pods). The control plane 215 may run an API server 216 (e.g., Kubernetes API server) that validates and configures the data for objects such as e.g., pods, services, and controllers as well as provides a focal point for the cluster 131's shared state. The control plane 215 may also run a scheduler service (not shown) that considers the resource needs of a pod, such as CPU or memory, along with the health of the cluster, and then schedules the pod to an appropriate worker node 131.

Controllers 218 and 219 may observe the state of the cluster 131 via the API server 216 and look for events corresponding to changes either to the desired state of resources (e.g., create, update, delete) or the cluster (e.g., pod or node dies). Controllers 218 and 219 may then make changes to the cluster 131 to ensure that the current state matches the desired state described by the observed resource (referred to as reconciling). Each controller 218 and 219 observes and reconciles certain object types as defined by the controller's metadata which includes an object type the controller will observe/reconcile and the particular class filters (if applicable) it uses, for example. The controllers 218 and 219 actuate objects after they are written by observing object types, and then triggering reconciles from events. After an object is created/updated/deleted, controllers observing that object type will receive a notification that the object has been changed, and they may read the state of the cluster 131 to see what has changed (instead of relying on the event for this information). For example, when a user wishes to scale up a deployment, a request may be sent to the API server 216 with the new desired configuration. The API server 216 in return publishes the change which is read by the deployment controller observing the deployment. Thus, the deployment controller creates one or more pods to conform to the new definition. A new pod creation is, in itself, a new change that the API server 216 may also broadcast to all event listeners. So, if there are any actions that should get triggered upon creation of a new pod, they may be registered automatically.

The control plane 215 may also include a master state store (not shown) that stores the persistent master state of the cluster 131 (e.g., an etcd store). The control plane 215 may also include a controller-manager service such as e.g., Kubernetes-controller-manager (referred to herein as "controller manager 217") that includes a set of informers 217A that watch the etcd store for changes to objects such as replication, namespace, and "serviceaccount" controller objects, and then uses the API to enforce the specified state. The controller-manager 217 may host a number of core controllers 218. For example, one controller 218 may consult the scheduler service and ensure that the correct number of pods is running. Another controller 218 may monitor pods, and if a pod goes down, may notice and respond. Another controller 218 connects services to pods, so requests go to the right endpoints. Still other controllers 218 may create accounts and API access tokens etc. The controller-manager 217 may include an informer 217A, to drive the reconciliation loop for each controller 218 through API events.

The REST APIs can be extended using special objects called Custom Resource Definitions (CRDs). A CRD object defines a new, unique object type in the cluster and allows the API server to handle its entire lifecycle. Custom Resource (CR) objects (hereinafter referred to as custom resources, or CRs) are created from CRDs that have been added to the cluster by a cluster administrator, allowing all cluster users to add the new object type into projects. When a cluster administrator adds a new CRD to the cluster, the API server reacts by creating a new RESTful resource path (e.g., API extension) that can be accessed by the entire cluster or a single project (namespace) and begins serving the specified CR.

Each CR requires a controller (reconciler) that observes/reconciles the particular object type of the CR to perform some meaningful function with it. For example, when an EtcdCluster CRD is created, a corresponding controller may take the corresponding EtcdCluster CR object and deploy an etcd cluster with it. A controller that observes/reconciles a CR object (also referred to herein as servicing a CR object) may be referred to herein as a CRD controller, such as CRD controllers 219 shown in FIG. 1. When a CRD is created, a CRD controller that can service the corresponding CR may be created along with the CRD. The CRD controller may be a custom controller defined as part of a new operator (using e.g., Operator SDK) or included in an operator pulled from an off cluster source (using e.g., OperatorHub) for example. Each CRD controller 219 may include an informer (e.g., informers 220A and 220B), to drive the reconciliation loop as well as a "reconcile" function (e.g., 221A and 221B), which takes these events and performs some operations based on them. Because extensions such as CRDs are not applied at cluster initiation however, CRD controllers 219 are each hosted in a service (not shown) that is separate from the controller-manager 217. Because each such service executes in its own deployment, a new pod is required at least for every group of CRDs, and in some scenarios, a separate pod is required for each CRD. This inflicts a sizeable cost in terms of resource consumption, particularly when the pods are made highly available. Although multiple Knative controllers can be built into one binary, this compilation occurs at build-time, not run-time and is thus not suitable for a mechanism such as e.g., OperatorHub.

Embodiments of the present disclosure overcome this problem by compiling each CRD controller 219 into a respective isolation module at a separate time from when the rest of the cluster is instantiated (e.g., at run-time), and launching the CRD controllers 219 dynamically once their respective API extensions are installed into the cluster 131. Indeed, each CRD controller 219 is compiled as part of a compilation process that is separate from the packaging of cluster 131. Although embodiments of the present disclosure are described with respect to a web assembly module (WASM) as an example isolation module, the isolation module may be any suitable module such as a Golang plugin (referred to herein as a "Go-plugin"), or any other suitable isolation module.

A WASM defines a portable binary code format for executable programs, a corresponding textual assembly language, and interfaces for facilitating interactions between such executable programs and their host environment. WASM code runs within a low-level virtual machine that mimics the functionality of the processing devices upon which it can be run. WASMs are portable, and support executable programs written in a variety of compiled languages such as Golang, C++, and Rust. Stated differently, programs in a wide range of languages may be compiled to a WASM. Furthermore, while WASMs assume certain prerequisites for their execution environments, they are designed to execute efficiently on a variety of operating systems and instruction set architectures.

Because each WASM executes within a virtual machine that is separated from the host runtime using fault isolation techniques, applications compiled into a WASM execute in isolation from the rest of their host environment and can't escape the "sandbox" of the WASM without going through the appropriate APIs.

Figure 2A:
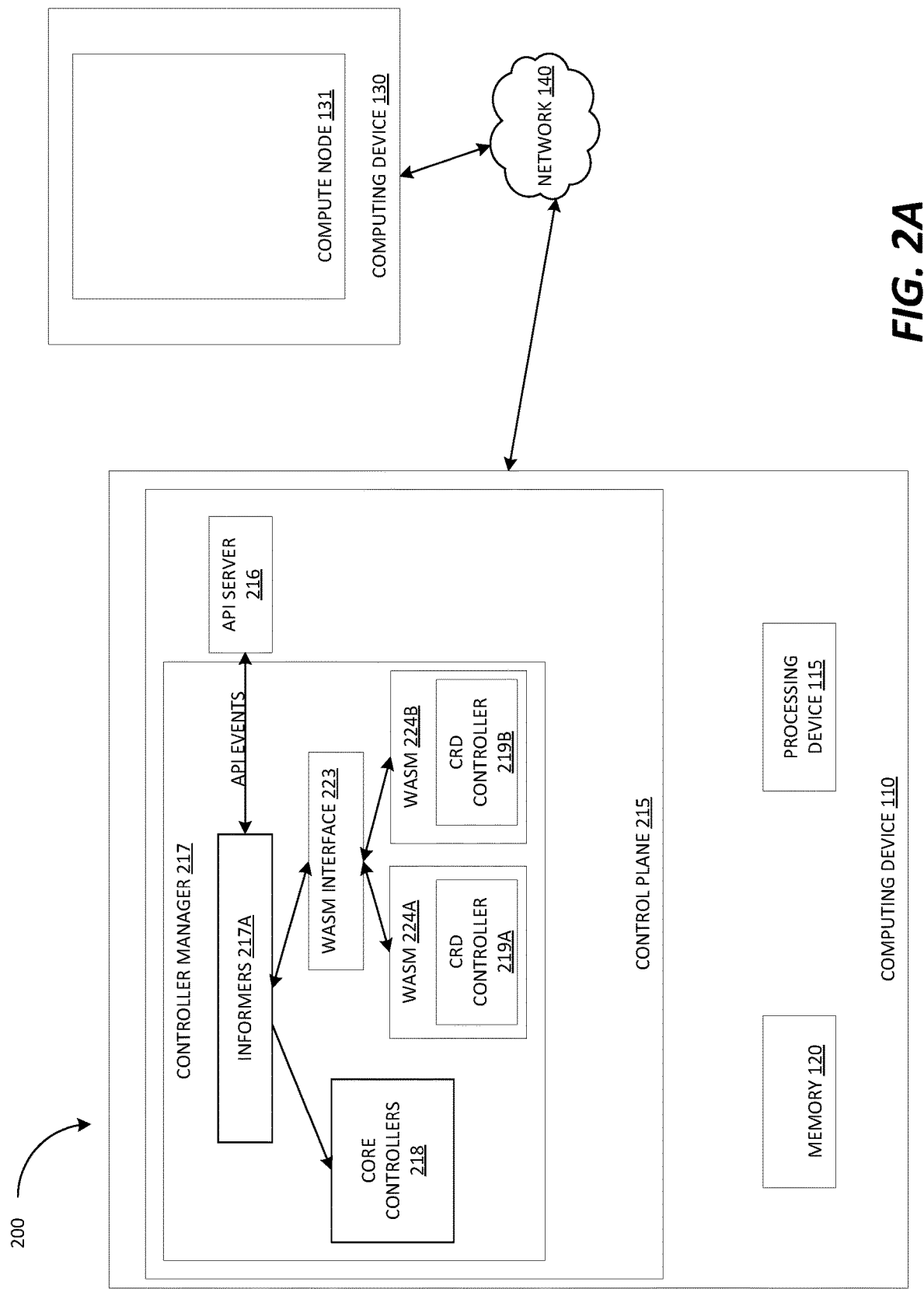
FIG. 2A is a block diagram that illustrates an example system, in accordance with some embodiments of the present disclosure.
Figure 2B:
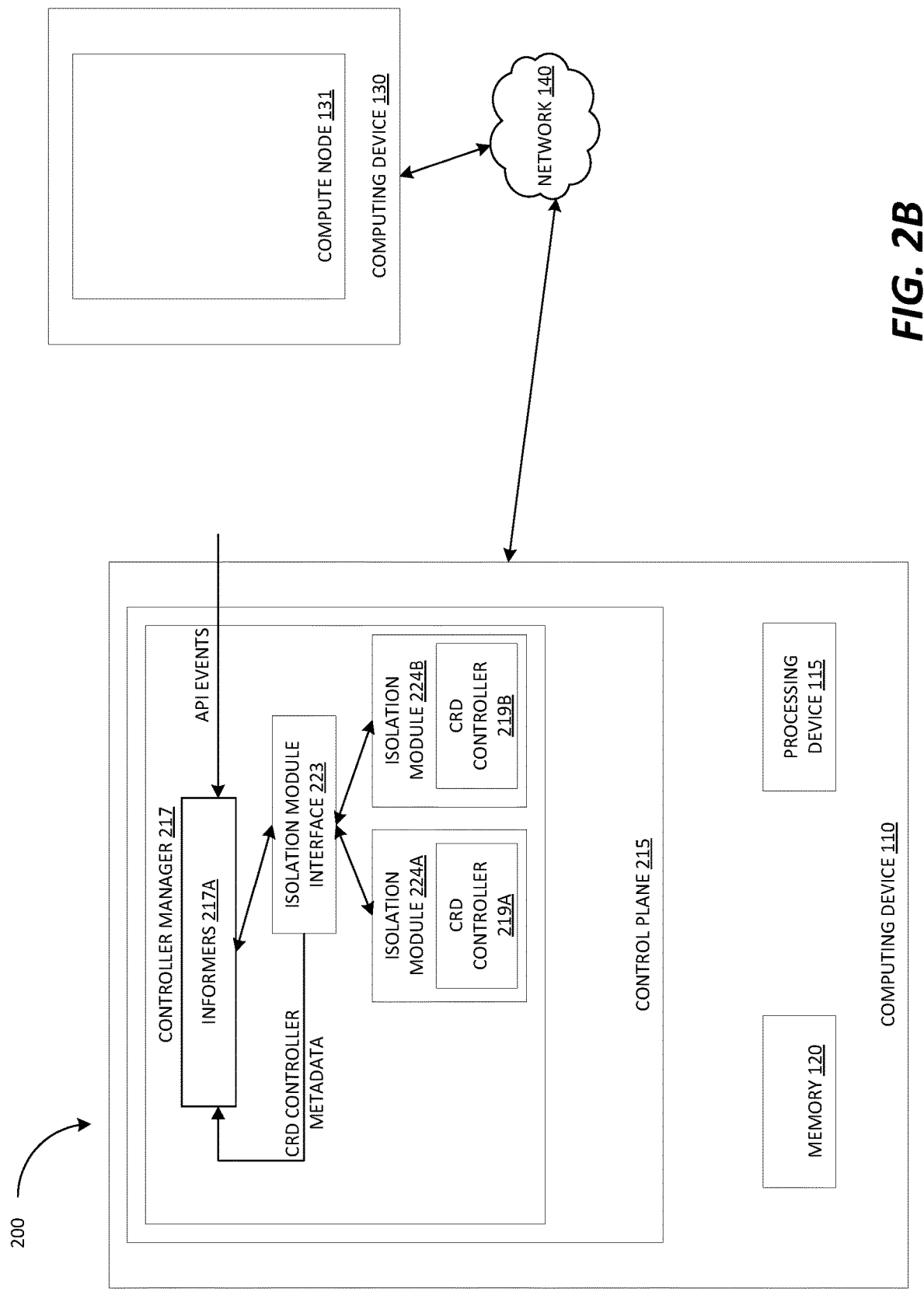
FIG. 2B is a block diagram that illustrates an example system, in accordance with some embodiments of the present disclosure.

Each CRD controller 219 may be a relatively self-contained entity of code, including an informer 220 to drive the reconciliation loop through API events as well as a "reconcile" function 221, which takes these events and performs some operations based on them (e.g., services them). This self-contained nature allows them to be compiled into a WASM like any other program. FIGS. 2A and 2B illustrate a system 200 in accordance with some embodiments of the present disclosure.

Upon creation of a CRD controller 219 by a user/developer, the user/developer may utilize language tooling and code generation components to compile a CRD controller 219 into a WASM module 224. Examples of such components may include a code generator for generating optimized machine code from the code of a CRD controller 219 by parallelizing compilation on a function-by-function level. As with a CRD controller 219, the WASM module 224 may be defined as part of a new operator (using e.g., Operator SDK) or included in an operator pulled from an off cluster source (using e.g., OperatorHub) for example. An installer controller (not shown) hosted on the controller-manager 217 may function to pull newly created isolation modules from e.g., OperatorHub and mount them into the controller-manager 217. The installer controller may itself be hosted on the controller-manager 217 or may be hosted on a separate service. In some embodiments, the installer controller may also be compiled into a WASM or other appropriate isolation module. In some embodiments, a newly created isolation module 224 may be mounted into the controller-manager 217 directly, as if it were a file. More specifically, the container host 214 may create a Kubernetes volume into which the newly created isolation module 224 is placed, and mount the volume into the controller-manager 217 directly. When the controller-manager 217 bootstraps, it may read the volume and start the isolation module 224.

As shown in FIG. 2A, the controller-manager 217 may act as the host of each CRD controller 219 and may include a WASM runtime (not shown) that facilitates execution of each of the CRD controllers 219 via their respective WASM 224. The WASM runtime may include an interface (WASM interface 223) comprising a set of APIs for facilitating interactions between the WASMs 224 and their host environment (e.g., controller-manager 217). These APIs may provide I/O between the controller-manager 217 and each WASM 224 (e.g., on behalf of each respective CRD controller 219). The WASM interface 223 may be any appropriate interface such as the WebAssembly System Interface (WASI), for example. The WASM runtime may also provide for the isolation of individual executions of WASM 224 from the underlying OS and/or the host application (e.g., controller-manager 217) that runs the module, thereby isolating failure modes of each CRD controller 219. When the WASM runtime executes a function in a WASM 224, it may provide the result of the function (e.g., success/fail) back to the control plane 215, for example. However, in the event of a failure, this failure is not propagated to the host application (e.g., the controller-manager 217). Therefore, if a single CRD controller 219 crashes it will not result in other CRD controllers 219 crashing with it, nor will the host application crash along with it.

The WASM interface 223 may manage the lifecycle of all of the CRD controllers 219 as well as manage communication between the controller-manager 217 and each CRD controller 219 via their respective WASM 224. More specifically, upon obtaining a new WASM 224A into which a newly defined CRD controller 219A has been compiled (e.g., using Operator SDK or pulled from an off-cluster source using OperatorHub as discussed above), the WASM interface 223 may mount the WASM 224A and provide I/O between the WASM 224A and the controller-manager 217.

As discussed above, when the new CRD controller 219A is generated, it includes controller metadata that describes what type of events the CRD controller 219A is to service. Because informer 217A is a programmable component, when the WASM interface 223 mounts the WASM 224A in which the new CRD controller 219A executes, it may update the informer 217A with the controller metadata of CRD controller 219A to indicate to the informer 217A what types of events the newly mounted CRD controller 219A will service. When an event of a the type serviced by CRD controller 219A is picked up by the informer 217A, it may determine that CRD controller 219 is servicing that event type, and inform the WASM interface 223 that an event pertaining to CRD controller 219A has been picked up. In this way, when an event of any type is picked up by the informer 217A, it may determine which CRD controller 219 is servicing that event type, and inform the WASM interface 223 that an event pertaining to that CRD controller 219 has been picked up. The WASM interface 223 may execute the WASM 224 that the relevant CRD controller 219 has been compiled into. In this way, each CRD controller can be launched dynamically once their new API extensions are installed into the cluster 131. The informer 217A may include a set of event queues (not shown), which allow serial handling of events per custom resource instance. For example, having a deployment controller servicing an event to change an image and an event to scale a pod up in parallel may result in an inconsistent state of the deployment. The set of event queues allow the informer 217A to process events serially on a custom resource by custom resource basis. In some embodiments, the set of event queues may also help to deduplicate conflicting events.

As can be seen in FIG. 2A, CRD controllers 219 of the cluster 131 may run in a single host service (e.g., the controller-manager 217), which executes the correct WASM 224 when a new API Event is received (the WASM module 224 corresponding to the CRD controller 219 that services that API event type). In this way, each CRD controller 219 may be used dynamically like a function (e.g., on demand), and does not run continuously in the background. This approach significantly reduces the overhead on memory and CPU resources, because CRD controllers 219 are "woken up" from their inactive state and executed only when they are actually needed. CRD controllers 219 are also all hosted in the same service, which removes the need for intercommunication between the various dependent CRD controllers 219, and reduces the network overhead. If the service that hosts these CRD controllers 219 is the controller-manager 217, this may also remove the need for network traffic to communicate with Kubernetes itself. This approach significantly reduces the overhead on memory and CPU resources that is accrued from adding new extensions to the cluster.

In some embodiments, a vertical auto-scaler (not shown) may be used to monitor resource consumption of the pod on which the controller-manager 217 is executing. For example, as larger numbers of WASMs are added to the controller-manager 217, the resource consumption may need to be adjusted. For example, additional processing device resources may need to be made available to the controller-manager 217 for it handle the added load. This avoids the need for horizontal auto-scaling which would involve the creation of additional CRD controllers, which is not possible as CRD controllers are single threaded. Although described with respect to WASMs, any appropriate isolation module may be utilized as shown in FIG. 2B.

Figure 3:
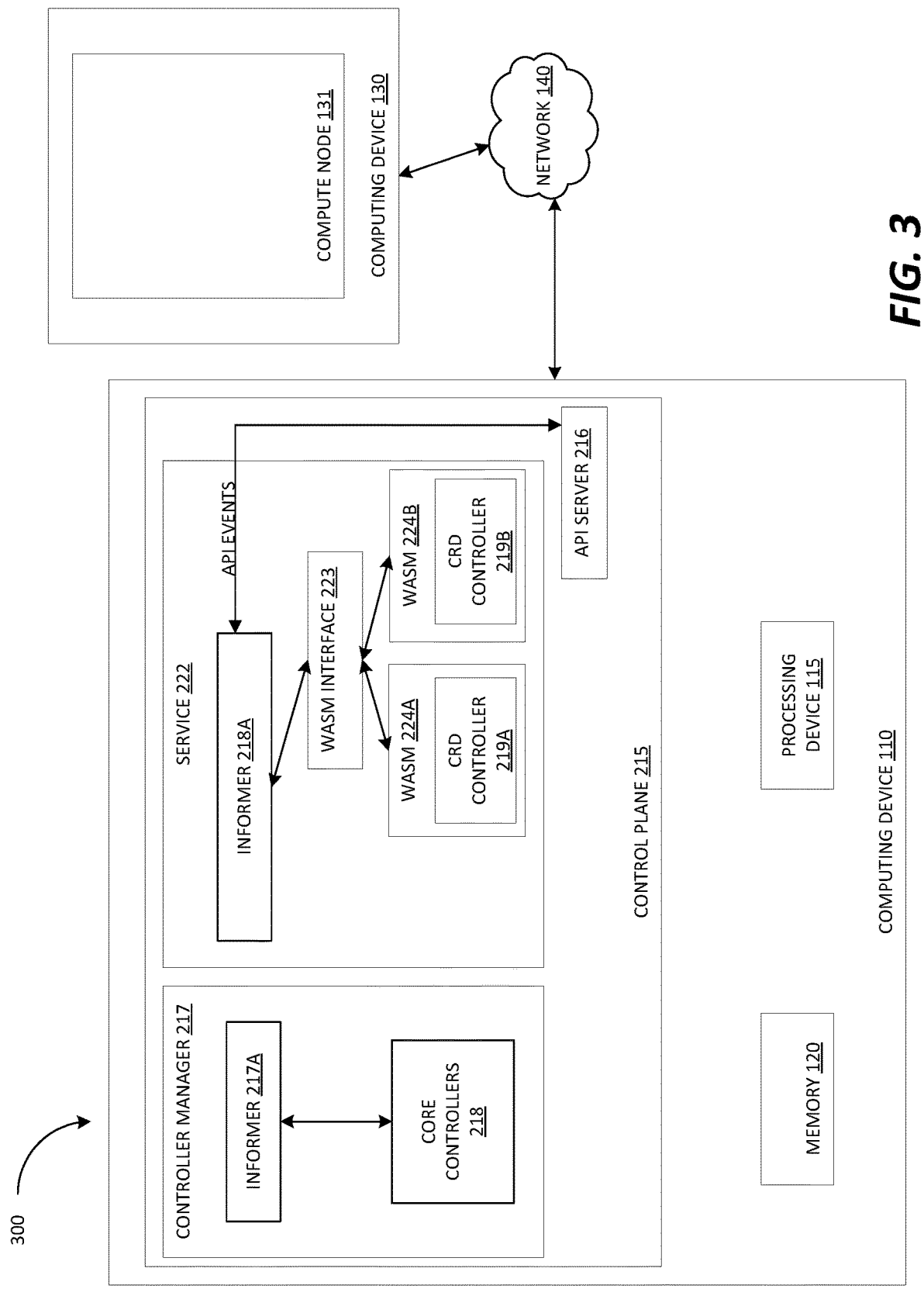
FIG. 3 is a block diagram that illustrates an example system, in accordance with some embodiments of the present disclosure.

In some embodiments, each CRD controller 219 (e.g., the isolation module thereof) may be hosted on a special service that is separate from the controller-manager 217, where the core controllers 218 may still be hosted. FIG. 3 illustrates a system 300 where the CRD controllers 219 may be hosted on a special controller manager service 222 that is separate from the controller-manager 217, where the core controllers 218 may still be hosted. System 300 may function similarly to system 200 described with respect to FIGS. 2A and 2B. When the CRD controllers 219 are hosted on the special controller manager service 222, the lifecycle of each CRD 219 may be managed directly by the container orchestration engine 214 and a higher level of isolation may be achieved.

Figure 4:
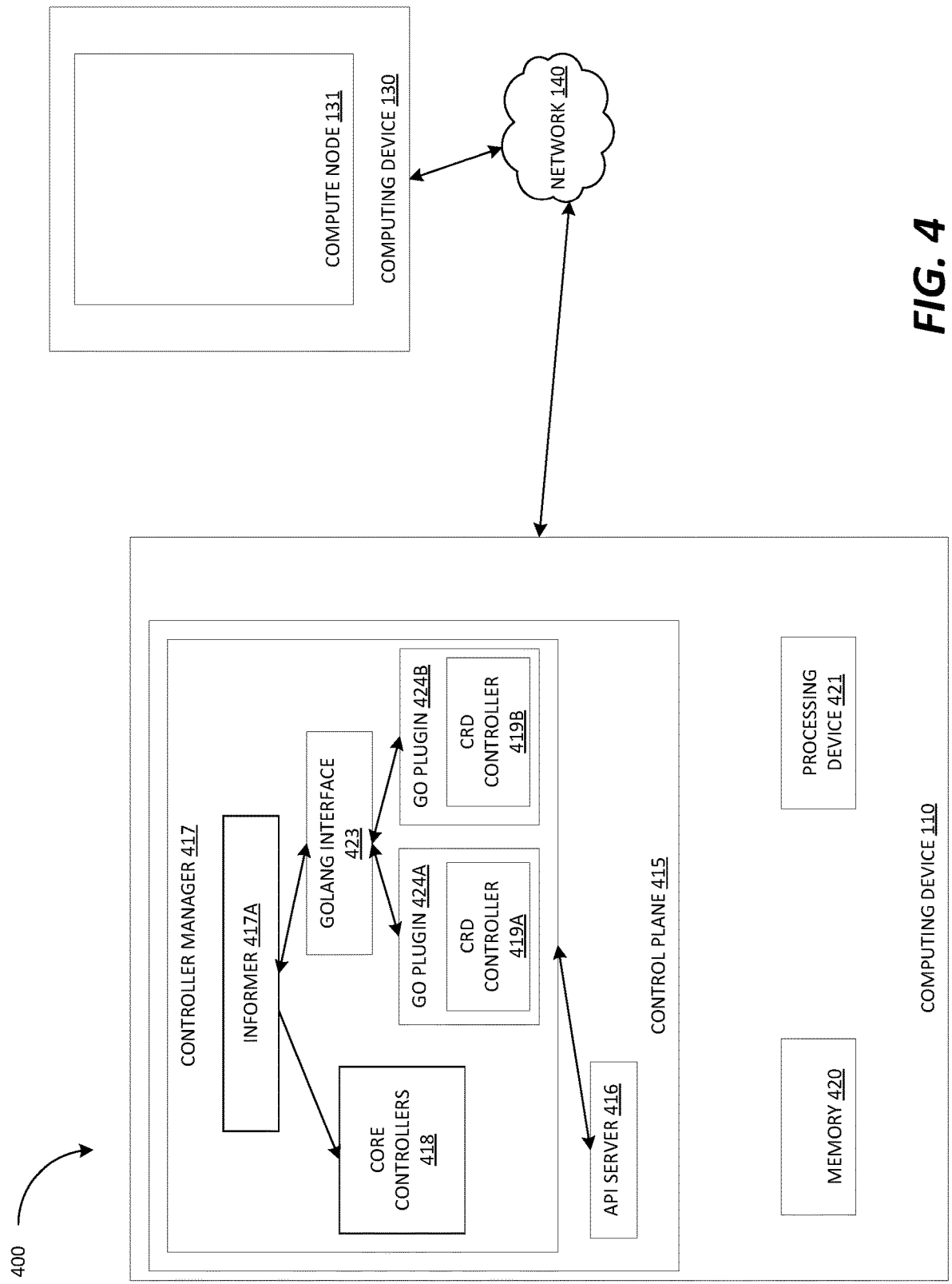
FIG. 4 is a block diagram that illustrates an example system, in accordance with some embodiments of the present disclosure.

Although FIG. 2A is described with respect to WASMs, any suitable isolation module may be used. FIG. 4 illustrates system 400, which is an embodiment of the present disclosure wherein the isolation modules are implemented as Go Plugins. Golang is a statically typed, compiled programming language, and programs written in Golang may be comprised of packages. A Go plugin may be a package with exported functions and variables that may be compiled as shared object libraries (e.g., produces a shared object library file when compiled) that can be loaded and bound to dynamically at run-time. A Go Plugin may allow for the creation of modular programs using these shared object libraries.

The system 400 may operate similarly to the system 200 described with respect to FIGS. 2A and 2B, but may utilize Go-plugins 424 instead of WASMs. More specifically, upon creation of a new CRD controller 419A, a user/developer may compile the CRD controller 419A into a Go-plugin 424A and provide the Go-plugin 424A to the controller-manager 417 (e.g., via OperatorSDK or OperatorHub as discussed hereinabove). A Golang interface 423 may mount the Go-plugin 424A and provide I/O between the Go-plugin 424A and the controller-manager 417.

When a new CRD controller 419A is generated, it includes controller metadata that describes what type events the CRD controller is to service. Because informer 417A is a programmable component, when the Golang interface 423 mounts the Go-plugin 424A running the new CRD controller 419A, it may update the informer 417A with the controller metadata of CRD controller 419A to indicate to the informer 417A what types of events the newly mounted CRD controller 419A will service. In this way, when an event of a certain type is picked up by the informer 417A, it may determine which CRD controller 419 is servicing that event type, and inform the Golang interface 423 that an event pertaining to that CRD controller 419 has been picked up as discussed above with respect to FIGS. 2A and 2B. The Golang interface 423 may execute the Go-plugin 424 that the relevant CRD controller 419 has been compiled into. It should be noted that Go-Plugins do not provide failure isolation as discussed above with respect to WASMs in FIG. 2A.

Figure 5:
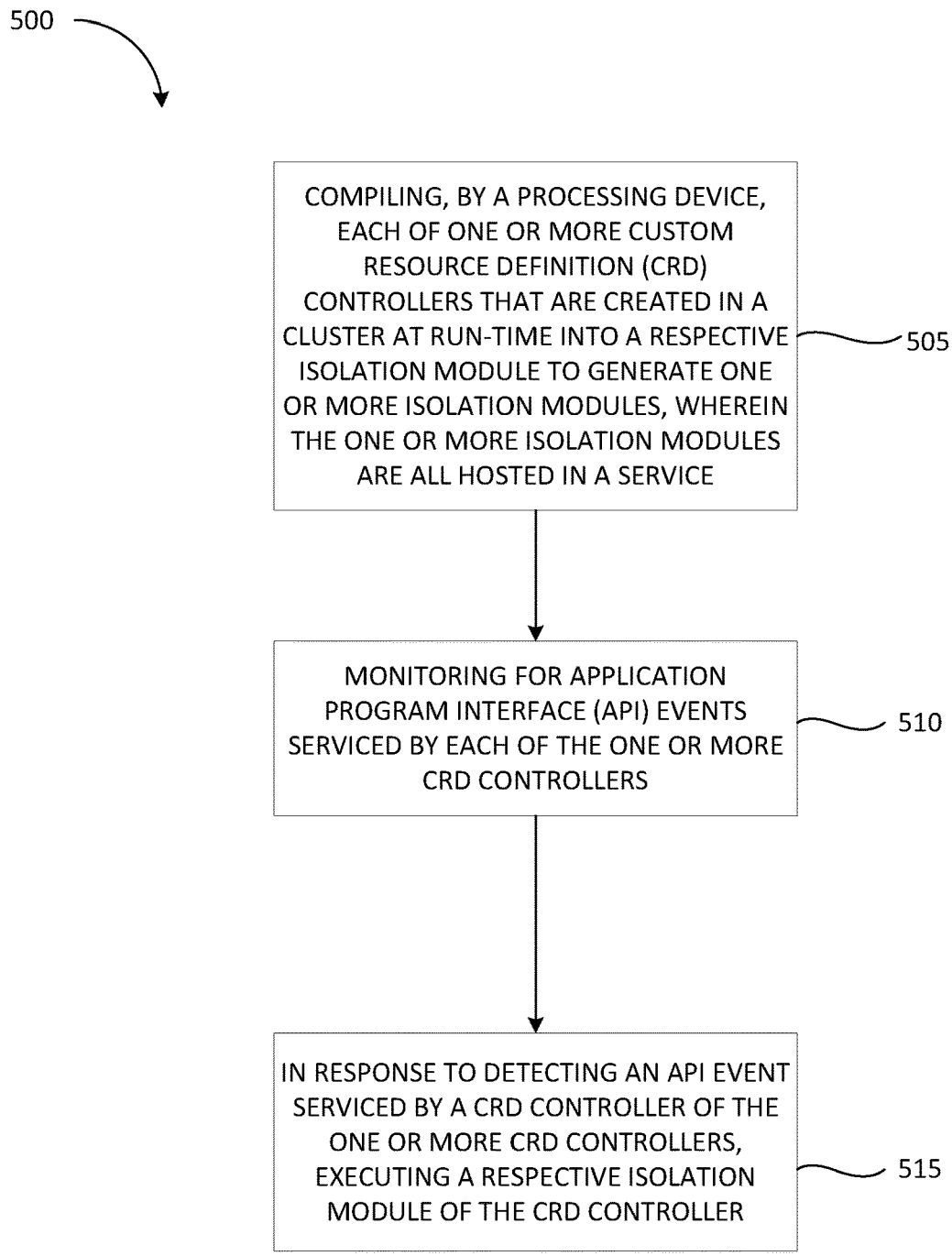
FIG. 5 is a flow diagram of a method for extending the container orchestration engine API in-process using isolation modules, in accordance with some embodiments of the present disclosure.

FIG. 5 is a flow diagram of a method 500 for extending the Kubernetes API in-process using isolation modules, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 500 may be performed by a computing device (e.g., computing device 110 illustrated in FIGS. 2A and 2B).

At block 505, computing device 110 may compile each of one or more custom resource definition (CRD) controllers 219 into a respective web assembly module (WASM) 224 and provide each of the WASM 224s to the controller-manager 217 (e.g., via OperatorSDK or OperatorHub as discussed hereinabove). The one or more WASMs 224 may be hosted in a single service (e.g., the controller-manager 217). The controller-manager 217 may thus act as the host of each CRD controller 219 and may include a WASM runtime (not shown) that facilitates execution of each WASM 224. The WASM runtime may include an interface (WASM interface 223) comprising a set of APIs for facilitating interactions between the WASMs 224 and their host environment (e.g., controller-manager 217). These APIs may provide I/O between the controller-manager 217 and each WASM 224 (e.g., on behalf of each respective CRD controller 219). The WASM interface 223 may be any appropriate interface such as the WebAssembly System Interface (WASI), for example. The WASM runtime may also provide for the isolation of individual executions of WASM 224 from the underlying OS and/or the host application (e.g., controller-manager 217) that runs the module, thereby isolating failure modes of each CRD controller 219. When the WASM runtime executes a function in a WASM 224, it may provide the result of the function (e.g., success/fail) back to the control plane 215, for example. However, in the event of a failure, this failure is not propagated to the host application (e.g., the controller-manager 217). Therefore, if a single CRD controller 219 crashes it will not result in other CRD controllers 219 crashing with it, nor will the host application (e.g., controller-manager 217) crash along with it.

At block 510, computing device 110 may monitor for application program interface (API) events serviced by each of the one or more CRD controllers using the informer 217A.

At block 515, computing device 110 may, in response to detecting an API event serviced by a particular CRD controller 219 of the one or more CRD controllers 219, execute the corresponding WASM 224 of the particular CRD controller 219.

Figure 6:
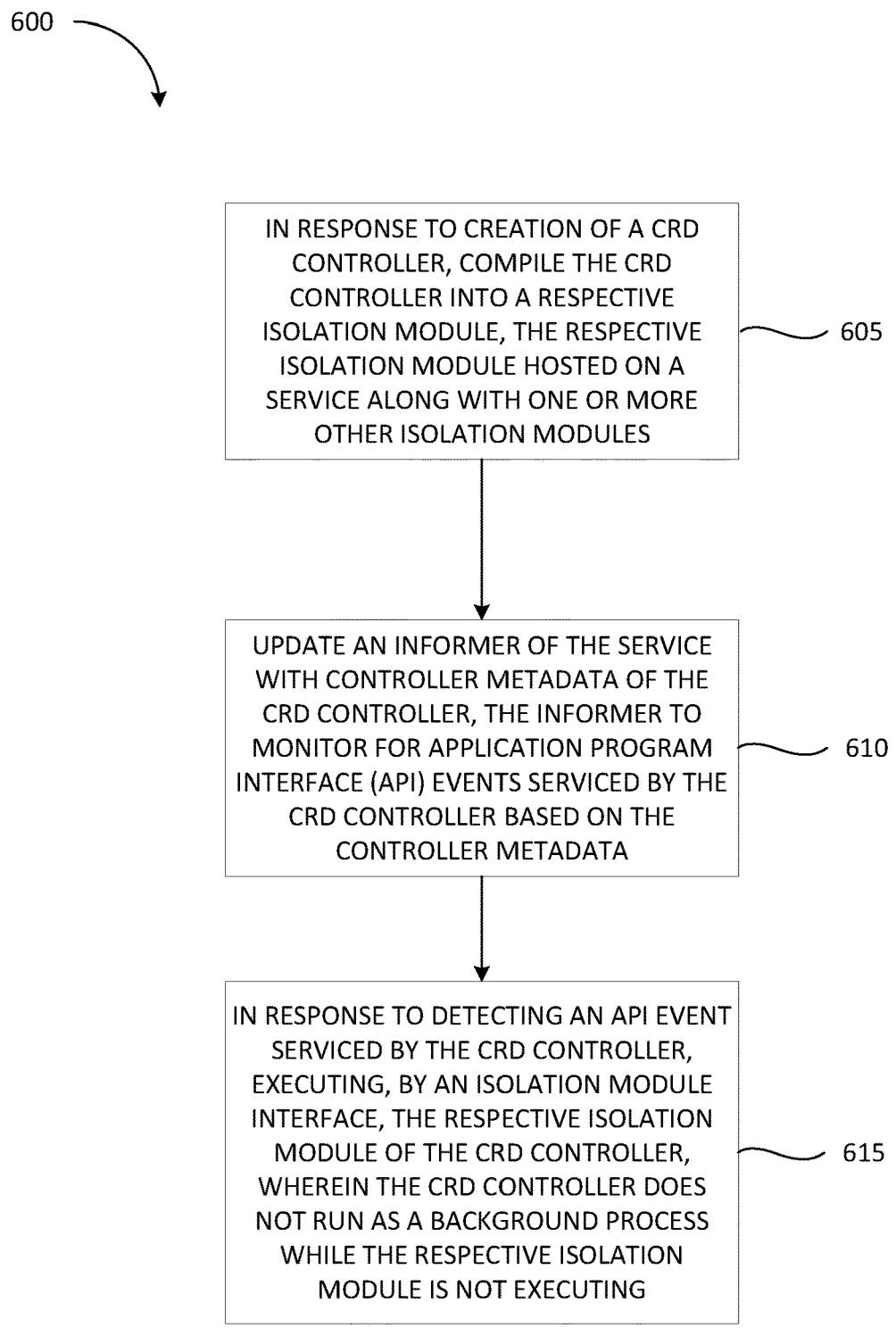
FIG. 6 is a flow diagram of a method for extending the container orchestration engine API in-process using isolation modules, in accordance with some embodiments of the present disclosure.

FIG. 6 is a flow diagram of a method 600 for extending the Kubernetes API in-process using isolation modules managed by an isolation module interface, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 600 may be performed by a computing device (e.g., computing device 110 illustrated in FIGS. 2A and 2B).

Referring also to FIG. 2B, upon creation of a new CRD and corresponding CRD controller 219A by a user, at block 605 the computing device 110 may compile the CRD controller 219A into a respective isolation module 224A using any appropriate language tooling and code generation components. Examples of such components may include a code generator for generating optimized machine code from the code of a CRD controller 219 by parallelizing compilation on a function-by-function level. The compilation of the CRD controller 219A may be initiated by the user, and the computing device 110 may provide this isolation module 224A and any associated controller metadata of the CRD controller 219A to the controller-manager 217 (e.g., via OperatorSDK or OperatorHub as discussed hereinabove). In some embodiments where Javascript is utilized to define the CRD controller 219A, the computing device 110 may provide the CRD controller 219A directly to the controller-manager 217, which may compile the CRD controller 219A into a respective isolation module 224A. In response to receiving isolation module 224A, the isolation module interface 223 may mount the isolation module 224A and provide I/O between the isolation module 224A and the controller-manager 217. In this way, one or more isolation modules 224 may be hosted in a single service (e.g., the controller-manager 217). The controller-manager 217 may thus act as the host of each CRD controller 219 and may include an isolation module runtime (not shown) that facilitates execution of each WASM 224.

At block 610, the computing device 110 may update an informer 217A of the controller-manager 217 with the controller metadata of the CRD controller 219A, so that the informer 217A can monitor for API events serviced by the CRD controller 219A based on the controller metadata. As discussed above, when a new CRD controller 219A is generated, it includes controller metadata that describes what type of events the CRD controller 219A is to service. Because informer 217A is a programmable component, when the isolation module interface 223 mounts the isolation module 224A running the new CRD controller 219A, it may update the informer 217A with the controller metadata of CRD controller 219A to indicate to the informer 217A what types of events the newly mounted CRD controller 219A will service.

At block 615, when an event of a certain type is picked up by the informer 217A, it may determine which CRD controller 219 is servicing that event type, and inform the isolation module interface 223 that an event pertaining to that CRD controller 219 has been picked up. The informer 217A may include a set of event queues (not shown), which allow serial handling of events per custom resource instance. For example, having a deployment controller servicing an event to change an image and an event to scale a pod up in parallel may result in an inconsistent state of the deployment. The set of event queues allow the informer 217A to process events serially on a custom resource by custom resource basis. In some embodiments, the set of event queues may also help to deduplicate conflicting events. The isolation module interface 223 may execute the isolation module 224 that the relevant CRD controller 219A has been compiled into. As can be seen in FIG. 2B, CRD controllers 219 of the cluster 131 may run in a single service (e.g., the controller-manager 217), which executes the correct isolation module 224 when a new API event is received (the isolation module corresponding to the CRD controller that services that API event type). In this way, each CRD controller 219 may be used like a function (e.g., on demand), and does not run continuously in the background. This approach significantly reduces the overhead on memory and CPU resources, because CRD controllers 219 are "woken up" and executed only when they are actually needed.

Figure 7:
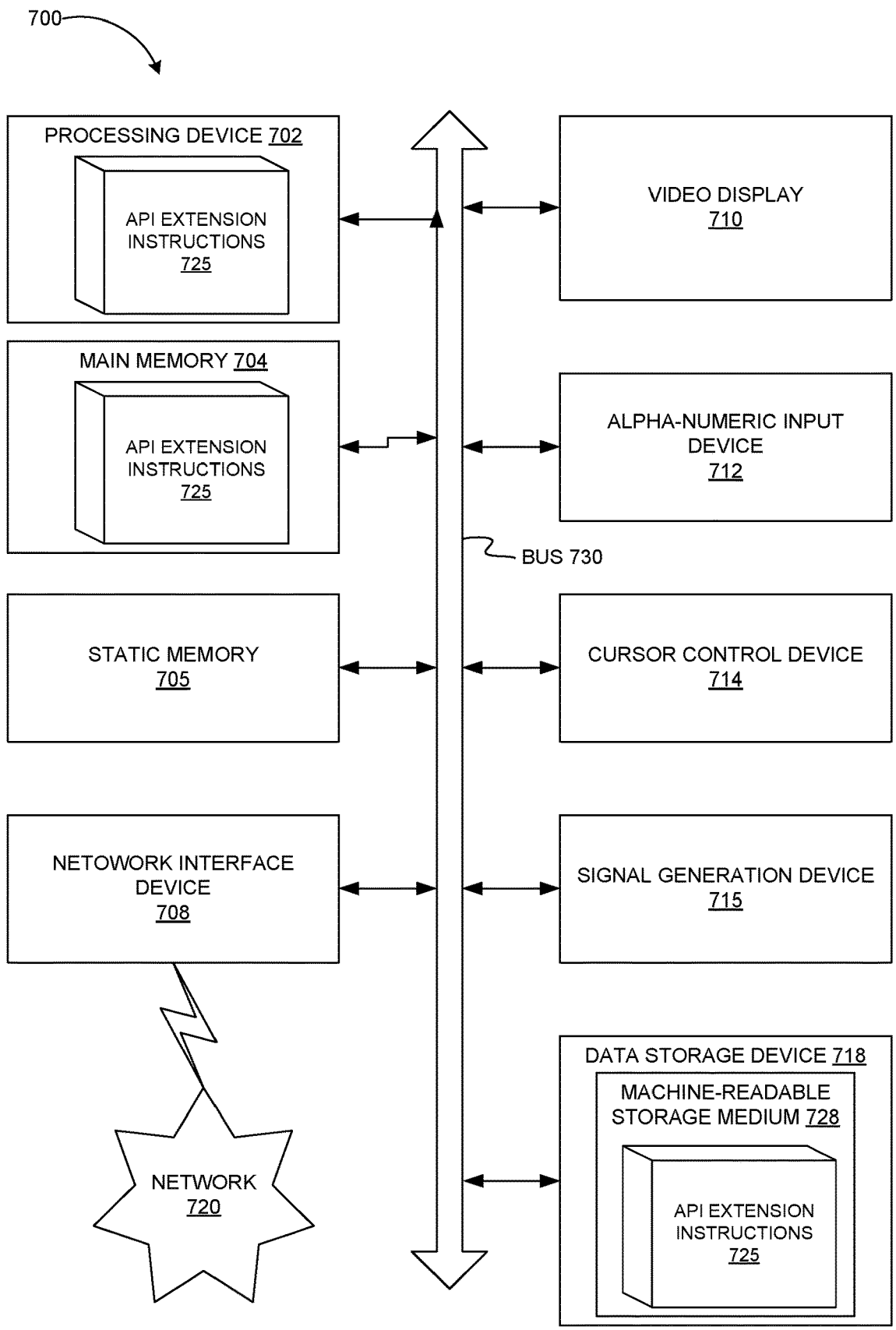
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for extending the Kubernetes API in-process. More specifically, the machine may compile each of one or more custom resource definition (CRD) controllers into a respective isolation module such as a web assembly module (WASM) as they are created. The one or more isolation modules may all be hosted in the same service (e.g., the controller manager service), which may include an isolation module runtime to facilitate compilation of CRD controllers. The isolation module runtime may also provide an interface for managing the lifecycle of the CRD controllers and facilitating communication between the service and the isolation modules. Upon compiling a CRD controller into an isolation module, the interface may update an informer of the service with controller metadata of the CRD controller to enable the interface to monitor for application program interface (API) events serviced by the CRD controller. In response to detecting an API event serviced by a CRD controller of the one or more CRD controllers, the informer may indicate to the interface that an event has been detected and the CRD controller that it pertains to. The interface may execute a respective isolation module of the CRD controller such that the CRD controller may service the detected event. In this way, the CRD controllers do not run in background (e.g., as background processes) while their respective isolation module is not executing.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute API extension instructions 725 for performing the operations and steps discussed herein.

The data storage device 718 may include a machine-readable storage medium 728, on which is stored one or more sets of API extension instructions 725 (e.g., software) embodying any one or more of the methodologies of functions described herein. The API extension instructions 725 may also reside, completely or at least partially, within the main memory 704 or within the processing device 702 during execution thereof by the computer system 700; the main memory 704 and the processing device 702 also constituting machine-readable storage media. The API extension instructions 725 may further be transmitted or received over a network 720 via the network interface device 708.

The machine-readable storage medium 728 may also be used to store instructions to perform a method for determining if a controller that can service a CRD exists, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: compiling, by a processing device, each of one or more custom resource definition (CRD) controllers that are created in a cluster at run-time into a respective isolation module to generate one or more isolation modules, wherein the one or more isolation modules are all hosted in a service; monitoring for application program interface (API) events serviced by each of the one or more CRD controllers; and in response to detecting an API event serviced by a CRD controller of the one or more CRD controllers, executing a respective isolation module of the CRD controller.

Example 2 is the method of example 1, further comprising: updating an informer with controller metadata of each of the one or more CRD controllers, wherein the informer performs the monitoring for API events observed/reconciled by each of the one or more CRD controllers based on the controller metadata of each of the one or more CRD controllers.

Example 3 is the method of example 2, further comprising: in response to detecting an API event serviced by a CRD controller of the one or more CRD controllers, transmitting an indication of the CRD controller to the isolation module interface, wherein the isolation module interface executes the respective isolation module of the CRD controller using a set of APIs that facilitate input/output operations between each of the one or more isolation modules and the service.

Example 4 is the method of example 1, wherein each of the one or more isolation modules are isolated from the service.

Example 5 is the method of example 1, wherein the service comprises a controller-manager service executing on a control plane of a container orchestration engine.

Example 6 is the method of example 1, wherein the service comprises a service that is separate from a controller-manager service executing on a control plane of a container orchestration engine.

Example 7 is the method of example 1, further comprising: monitoring resource consumption of a pod on which the one or more isolation modules are hosted using a vertical autoscaler; and in response to determining that additional resources are needed, allocating additional resources to the pod.

Example 8 is a system comprising: a memory; and a processing device operatively coupled to the memory, the processing device to: compile, each of one or more custom resource definition (CRD) controllers that are created in a cluster at run-time into a respective isolation module to generate one or more isolation modules, wherein the one or more isolation modules are all hosted in a service; monitor for application program interface (API) events serviced by each of the one or more CRD controllers; and in response to detecting an API event serviced by a CRD controller of the one or more CRD controllers, execute a respective isolation module of the CRD controller.

Example 9 is the system of example 8, wherein the processing device is further to: update an informer with controller metadata of each of the one or more CRD controllers, wherein the informer performs the monitoring for API events observed/reconciled by each of the one or more CRD controllers based on the controller metadata of each of the one or more CRD controllers.

Example 10 is the system of example 9, wherein the processing device is further to: in response to detecting an API event serviced by a CRD controller of the one or more CRD controllers, transmit an indication of the CRD controller to an isolation module interface, wherein the isolation module interface executes the respective isolation module of the CRD controller using a set of APIs that facilitate input/output operations between each of the one or more isolation modules and the service.

Example 11 is the system of example 8, wherein each of the one or more isolation modules are isolated from the service.

Example 12 is the system of example 8, wherein the service comprises a controller-manager service executing on a control plane of a container orchestration engine.

Example 13 is the system of example 8, wherein the service comprises a service that is separate from a controller-manager service executing on a control plane of a container orchestration engine.

Example 14 is the system of example 8, wherein the processing device is further to: monitor resource consumption of a pod on which the one or more isolation modules are hosted using a vertical autoscaler; and in response to determining that additional resources are needed, allocate additional resources to the pod.

Example 15 is a system comprising a memory; and a processing device, operatively coupled to the memory, the processing device to: in response to creation of a CRD controller, compile the CRD controller into a respective isolation module, the respective isolation module hosted on a service along with one or more other isolation modules; update an informer of the service with controller metadata of the CRD controller, the informer to monitor for application program interface (API) events serviced by the CRD controller based on the controller metadata; and in response to detecting an API event serviced by the CRD controller, executing, by an isolation module interface, the respective isolation module of the CRD controller, wherein the CRD controller does not run as a background process while the respective isolation module is not executing.

Example 16 is the system of example 15, wherein the controller metadata of the CRD controller indicates API events serviced by the CRD controller.

Example 17 is the system of example 16, wherein the processing device is further to: in response to detecting an API event serviced by the CRD controller, transmit an indication of the CRD controller to the isolation module interface, wherein the isolation module interface executes the respective isolation module of the CRD controller using a set of APIs that facilitate input/output operations between the isolation module and the service.

Example 18 is the system of example 15, wherein the isolation module isolates the CRD controller from the service.

Example 19 is the system of example 15, wherein the service comprises a controller-manager service executing on a control plane of a container orchestration engine.

Example 20 is the system of example 15, wherein the isolation module comprises a web assembly module (WASM).

Example 21 is the system of example 15, wherein the processing device is further to: monitor resource consumption of a pod on which the isolation modules are hosted using a vertical autoscaler; and in response to determining that additional resources are needed, allocate additional resources to the pod.

Example 22 is a non-transitory computer readable medium, having instructions stored thereon which, when executed by a processing device, cause the processing device to: in response to creation of a CRD controller, compile, by the processing device, the CRD controller into a respective isolation module, the respective isolation module hosted on a service along with one or more other isolation modules; update an informer of the service with controller metadata of the CRD controller, the informer to monitor for application program interface (API) events serviced by the CRD controller based on the controller metadata; and in response to detecting an API event serviced by the CRD controller, executing, by an isolation module interface, the respective isolation module of the CRD controller, wherein the CRD controller does not run as a background process while the respective isolation module is not executing.

Example 23 is the non-transitory computer readable medium of example 22, wherein the controller metadata of the CRD controller indicates API events serviced by the CRD controller.

Example 24 is the non-transitory computer readable medium of example 23, wherein the processing device is further to: in response to detecting an API event serviced by the CRD controller, transmit an indication of the CRD controller to the isolation module interface, wherein the isolation module interface executes the respective isolation module of the CRD controller using a set of APIs that facilitate input/output operations between the isolation module and the service.

Example 25 is the non-transitory computer readable medium of example 22, wherein the isolation module isolates the CRD controller from the service.

Example 26 is the non-transitory computer readable medium of example 22, wherein the service comprises a controller-manager service executing on a control plane of a container orchestration engine.

Example 27 is the non-transitory computer readable medium of example 22, wherein the isolation module comprises a web assembly module (WASM).

Example 28 is the non-transitory computer readable medium of example 22, wherein the processing device is further to: monitor resource consumption of a pod on which the isolation modules are hosted using a vertical autoscaler; and in response to determining that additional resources are needed, allocate additional resources to the pod.

Example 29 is an apparatus comprising: means for compiling each of one or more custom resource definition (CRD) controllers that are created in a cluster at run-time into a respective isolation module to generate one or more isolation modules, wherein the one or more isolation modules are all hosted in a service; means for monitoring for application program interface (API) events serviced by each of the one or more CRD controllers; and means for, in response to detecting an API event serviced by a CRD controller of the one or more CRD controllers, executing a respective isolation module of the CRD controller.

Example 30 is the apparatus of example 29, further comprising: means for updating an informer with controller metadata of each of the one or more CRD controllers, wherein the informer performs the monitoring for API events observed/reconciled by each of the one or more CRD controllers based on the controller metadata of each of the one or more CRD controllers.

Example 31 is the apparatus of example 30, further comprising: means for, in response to detecting an API event serviced by a CRD controller of the one or more CRD controllers, transmitting an indication of the CRD controller to the isolation module interface, wherein the isolation module interface executes the respective isolation module of the CRD controller using a set of APIs that facilitate input/output operations between each of the one or more isolation modules and the service.

Example 32 is the apparatus of example 29, wherein each of the one or more isolation modules are isolated from the service.

Example 33 is the apparatus of example 29, wherein the service comprises a controller-manager service executing on a control plane of a container orchestration engine.

Example 34 is the apparatus of example 29, wherein the service comprises a controller-manager service executing on a control plane of a container orchestration engine.

Example 35 is the apparatus of example 29, wherein each of the one or more isolation modules comprises a web assembly module (WASM).

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
  compiling, by a processing device, each of one or more custom resource definition (CRD) controllers that are created in a cluster at run-time into a respective isolation module to generate one or more isolation modules, wherein the one or more isolation modules are all hosted in a service;
  monitoring for application program interface (API) events serviced by each of the one or more CRD controllers; and
  in response to detecting an API event serviced by a CRD controller of the one or more CRD controllers, executing a respective isolation module of the CRD controller.

2. The method of claim 1, further comprising:
updating an informer with controller metadata of each of the one or more CRD controllers, wherein the informer performs the monitoring for API events serviced by each of the one or more CRD controllers based on the controller metadata of each of the one or more CRD controllers.

3. The method of claim 2, further comprising:
in response to detecting the API event serviced by a CRD controller of the one or more CRD controllers, transmitting an indication of the CRD controller to an isolation module interface, wherein the isolation module interface executes the respective isolation module of the CRD controller using a set of APIs that facilitate input/output operations between each of the one or more isolation modules and the service.

4. The method of claim 1, wherein each of the one or more isolation modules are isolated from the service.

5. The method of claim 1, wherein the service comprises a controller-manager service executing on a control plane of a container orchestration engine.

6. The method of claim 1, wherein the service comprises a service that is separate from a controller-manager service executing on a control plane of a container orchestration engine.

7. The method of claim 1, further comprising:
monitoring resource consumption of a pod on which the one or more isolation modules are hosted using a vertical autoscaler; and
in response to determining that additional resources are needed, allocating additional resources to the pod.

8. A system comprising:
a memory; and
a processing device, operatively coupled to the memory, the processing device to:
in response to creation of a CRD controller, compile the CRD controller into a respective isolation module, the respective isolation module hosted on a service along with one or more other isolation modules;
update an informer of the service with controller metadata of the CRD controller, the informer to monitor for application program interface (API) events serviced by the CRD controller based on the controller metadata; and
in response to detecting an API event serviced by the CRD controller, executing, by an isolation module interface, the respective isolation module of the CRD controller to transition the CRD controller from an inactive state to an active state.

9. The system of claim 8, wherein the controller metadata of the CRD controller indicates API events serviced by the CRD controller.

10. The method of claim 9, further comprising:
in response to detecting the API event serviced by a CRD controller, transmit an indication of the CRD controller to an isolation module interface, wherein the isolation module interface executes the respective isolation module of the CRD controller using a set of APIs that facilitate input/output operations between the isolation module and the service.

11. The system of claim 8, wherein the isolation module isolates the CRD controller from the service.

12. The system of claim 8, wherein the service comprises a controller-manager service executing on a control plane of a container orchestration engine.

13. The system of claim 8, wherein the isolation module comprises a web assembly module (WASM).

14. The system of claim 8, wherein the processing device is further to:
monitor resource consumption of a pod on which the isolation modules are hosted using a vertical autoscaler; and
in response to determining that additional resources are needed, allocate additional resources to the pod.

15. A non-transitory computer readable medium, having instructions stored thereon which, when executed by a processing device, cause the processing device to:
in response to creation of a CRD controller, compile, by the processing device, the CRD controller into a respective isolation module, the respective isolation module hosted on a service along with one or more other isolation modules;
update an informer of the service with controller metadata of the CRD controller, the informer to monitor for application program interface (API) events serviced by the CRD controller based on the controller metadata; and
in response to detecting an API event serviced by the CRD controller, executing, by an isolation module interface, the respective isolation module of the CRD controller to transition the CRD controller from an inactive state to an active state.

16. The non-transitory computer readable medium of claim 15, wherein the controller metadata of the CRD controller indicates API events serviced by the CRD controller.

17. The method of claim 16, further comprising:
in response to detecting the API event serviced by a CRD controller, transmit an indication of the CRD controller to an isolation module interface, wherein the isolation module interface executes the respective isolation module of the CRD controller using a set of APIs that facilitate input/output operations between the isolation module and the service.

18. The non-transitory computer readable medium of claim 15, wherein the isolation module isolates the CRD controller from the service.

19. The non-transitory computer readable medium of claim 15, wherein the service comprises a controller-manager service executing on a control plane of a container orchestration engine.

20. The non-transitory computer readable medium of claim 15, wherein the isolation module comprises a web assembly module (WASM).

* * * * *